US011366800B2

(12) United States Patent
Arumugham et al.

(10) Patent No.: US 11,366,800 B2
(45) Date of Patent: Jun. 21, 2022

(54) SYSTEM AND METHOD TO AUTOMATE VALIDATING MEDIA REDIRECTION IN TESTING PROCESS

(71) Applicant: American Megatrends International, LLC, Duluth, GA (US)

(72) Inventors: Ramachandran Arumugham, Chennai (IN); Arunprasad Rajaiah, Chennai (IN); Vinothkumar Manickavelu, Chennai (IN)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 700 days.

(21) Appl. No.: 15/243,131

(22) Filed: Aug. 22, 2016

(65) Prior Publication Data

US 2018/0052881 A1    Feb. 22, 2018

(51) Int. Cl.
*G06F 16/44*  (2019.01)
*G06F 16/23*  (2019.01)
*G06F 16/957* (2019.01)

(52) U.S. Cl.
CPC .......... *G06F 16/2365* (2019.01); *G06F 16/44* (2019.01); *G06F 16/9574* (2019.01)

(58) Field of Classification Search
CPC .. G06F 16/2365; G06F 16/9574; G06F 17/44; G06F 17/30; G06F 16/44; G06F 16/334
USPC ......................................................... 707/697
See application file for complete search history.

(56) References Cited

U.S. PATENT DOCUMENTS

| | | | | |
|---|---|---|---|---|
| 2002/0143798 A1* | 10/2002 | Lisiecki | .............. | G06F 16/1844 |
| 2008/0189529 A1* | 8/2008 | Bohizic | .............. | G06F 11/3672 712/227 |
| 2009/0013056 A1* | 1/2009 | Weinstock | ........... | H04N 21/226 709/208 |
| 2014/0280756 A1* | 9/2014 | Maity | ..................... | H04L 67/38 709/219 |
| 2017/0070590 A1* | 3/2017 | Balakrishnan | .......... | G06F 3/067 |
| 2017/0111455 A1* | 4/2017 | Raju | ..................... | H04L 67/141 |

* cited by examiner

*Primary Examiner* — Hosain T Alam
*Assistant Examiner* — Tracy M McGhee
(74) *Attorney, Agent, or Firm* — Locke Lord LLP; Tim Tingkang Xia, Esq.

(57) ABSTRACT

A system and method to automate validating media redirection in a virtual media redirection testing process. A computing device is provided for performing the test. During the test, the computing device executes an automated script to obtain, from a media storage device, a media file to be redirected, and then calculate a first checksum value for the media file being obtained. The computing device then executes a redirection module to perform the virtual media redirection process for the media file, and copy the media file to a local path of the computing device. Once the media file is redirected, the automated script calculates a second checksum value for the media file at the local path of the computing device. Thus, the media file may be validated by matching the two checksum values, and the redirection process is determined to be successful when the checksum values match.

19 Claims, 4 Drawing Sheets

SYSTEM AND METHOD TO AUTOMATE VALIDATING MEDIA REDIRECTION IN TESTING PROCESS

FIELD

The present disclosure relates generally to virtual media redirection technology, and particularly to system and methods to automate validating media redirection in a virtual media redirection testing process.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Typically, a baseboard management controller (BMC) may provide media redirection functionalities for its host computer. For example, a user may use the virtual media redirection functionalities on the BMC to perform remote media redirection for devices such as a compact disk (CD) drive, a floppy drive or a hard disk drive (HDD) to the host computer. In the virtual media redirection testing process, the data of the files or the image being redirected may require validation to ensure that there is no data loss for the files or image being redirected during the media redirection process. However, there is no validating tool currently available for testing purposes. To perform validation, a user may have to manually check the contents of the redirected files or image with the original files or image to confirm that there is no data loss for the redirected files or image.

Therefore, an unaddressed need exists in the art to address the aforementioned deficiencies and inadequacies.

SUMMARY

Certain aspects of the present disclosure direct to a system, which includes a computing device for performing a test of a virtual media redirection process. In certain embodiments, the computing device includes a processor and a storage device storing computer executable code. The computer executable code, when executed at the processor, is configured to: obtain, from a media storage device, a media file to be redirected; calculate a first checksum value for the media file being obtained; perform the virtual media redirection process to redirect the media file to the computing device, and copy the media file to a local path of the computing device; calculate a second checksum value for the media file at the local path of the computing device; and validate the media file by matching the second checksum value with the first checksum value, wherein the media file is validated when the second checksum value matches with the first checksum value.

In certain embodiments, the media file is an ISO image file. In certain embodiments, the media file is a specific file in an ISO image file.

In certain embodiments, the computer executable code includes: a virtual media redirection module, configured to perform the virtual media redirection process for the computing device by emulating a virtual media at the local path of the computing device, and to copy the media file to the local path; and a validation module configured to: obtain the media file to be redirected; calculate the first checksum value for the media file being obtained; calculate the second checksum value for the media file at the local path of the computing device; and validate the media file by matching the second checksum value with the first checksum value.

In certain embodiments, the validation module is an automated script module.

In certain embodiments, the virtual media redirection module is a virtual media command line interface (VMCLI) module, configured to emulate the virtual media at the local path of the computing device via a universal serial bus (USB) interface.

In certain embodiments, the system further includes an evaluation board communicatively connected to the computing device via the USB interface for the test of the virtual media redirection process.

In certain embodiments, the validation module is further configured to: prior to performing the virtual media redirection process, check whether a USB redirection connection exists for the computing device; and if the USB redirection connection exists, disconnect the USB redirection connection.

In certain embodiments, the validation module is further configured to: generate a validation report based on a test result of the virtual media redirection process, wherein: the test result includes information indicating the virtual media redirection process to be successful when the media file is validated; and the test result includes information indicating the virtual media redirection process to be unsuccessful when the media file is not validated.

In certain embodiments, the system further includes a client computing device communicatively connected to the computing device, wherein the media storage device is located at the client computing device.

Certain aspects of the present disclosure direct to a method for performing a test of a virtual media redirection process. In certain embodiments, the method includes: obtaining, by a validation module executed at a computing device, a media file to be redirected from a media storage device; calculating, by the validation module executed at the computing device, a first checksum value for the media file being obtained; performing, by a virtual media redirection module executed at the computing device, the virtual media redirection process to redirect the media file to the computing device, and copying the media file to a local path of the computing device; calculating, by the validation module executed at the computing device, a second checksum value for the media file at the local path of the computing device; and validating, by the validation module executed at the computing device, the media file by matching the second checksum value with the first checksum value, wherein the media file is validated when the second checksum value matches with the first checksum value.

In certain embodiments, the validation module is an automated script module.

In certain embodiments, the virtual media redirection module is a VMCLI module, configured to emulate the virtual media at the local path of the computing device via a USB interface.

In certain embodiments, the method further includes: prior to performing the virtual media redirection process, checking, by the validation module executed at the computing device, whether a USB redirection connection exists for the computing device; and if the USB redirection connection exists, disconnecting, by the validation module executed at the computing device, the USB redirection connection.

In certain embodiments, the method further includes: generating, by the validation module executed at the computing device, a validation report based on a test result of the virtual media redirection process, wherein: the test result includes information indicating the virtual media redirection process to be successful when the media file is validated; and the test result includes information indicating the virtual media redirection process to be unsuccessful when the media file is not validated.

Certain aspects of the present disclosure direct to a non-transitory computer readable medium storing computer executable code. The computer executable code, when executed at a processor of a computing device for performing a test of a virtual media redirection process, is configured to: obtain, from a media storage device, a media file to be redirected; calculate a first checksum value for the media file being obtained; perform the virtual media redirection process to redirect the media file to the computing device, and copy the media file to a local path of the computing device; calculate a second checksum value for the media file at the local path of the computing device; and validate the media file by matching the second checksum value with the first checksum value, wherein the media file is validated when the second checksum value matches with the first checksum value.

In certain embodiments, the computer executable code includes: a virtual media redirection module, configured to perform the virtual media redirection process for the computing device by emulating a virtual media at the local path of the computing device, and to copy the media file to the local path; and a validation module configured to: obtain the media file to be redirected; calculate the first checksum value for the media file being obtained; calculate the second checksum value for the media file at the local path of the computing device; and validate the media file by matching the second checksum value with the first checksum value. In certain embodiments, the validation module is an automated script module.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing may be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" may be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The term "IPMI," as used herein, refers to the Intelligent Platform Management Interface, which is a set of computer interface specifications for an autonomous computer subsystem that provides management and monitoring capabilities independently of the host system's CPU, firmware (BIOS or UEFI) and operating system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art. Like numbers refer to like elements throughout.

The systems and methods described herein may be implemented by one or more computer programs executed by one or more processors. The computer programs include processor-executable codes or instructions that are stored on a non-transitory tangible computer readable medium. The computer programs may also include stored data. Non-limiting examples of the non-transitory tangible computer readable medium are nonvolatile memory, magnetic storage, and optical storage.

As discussed above, in the virtual media redirection testing process, the data of the files or the image being redirected may require validation to ensure that there is no data loss for the files or image being redirected during the media redirection process. In certain embodiments, the virtual media redirection process is performed by the virtual media redirection feature provided by the BMC, in which a user may perform remote media redirection for device such as CD, floppy drive and HDD to the host computing device. For example, in certain embodiments, the BMC may provide a virtual media redirection module, such as a virtual media command line interface (VMCLI) application, which is a command line utility that allows the user to perform remote media redirection. Thus, an automated script program may be provided to work with the VMCLI in order to automate the validation of media redirection in the testing process.

Figure 1:
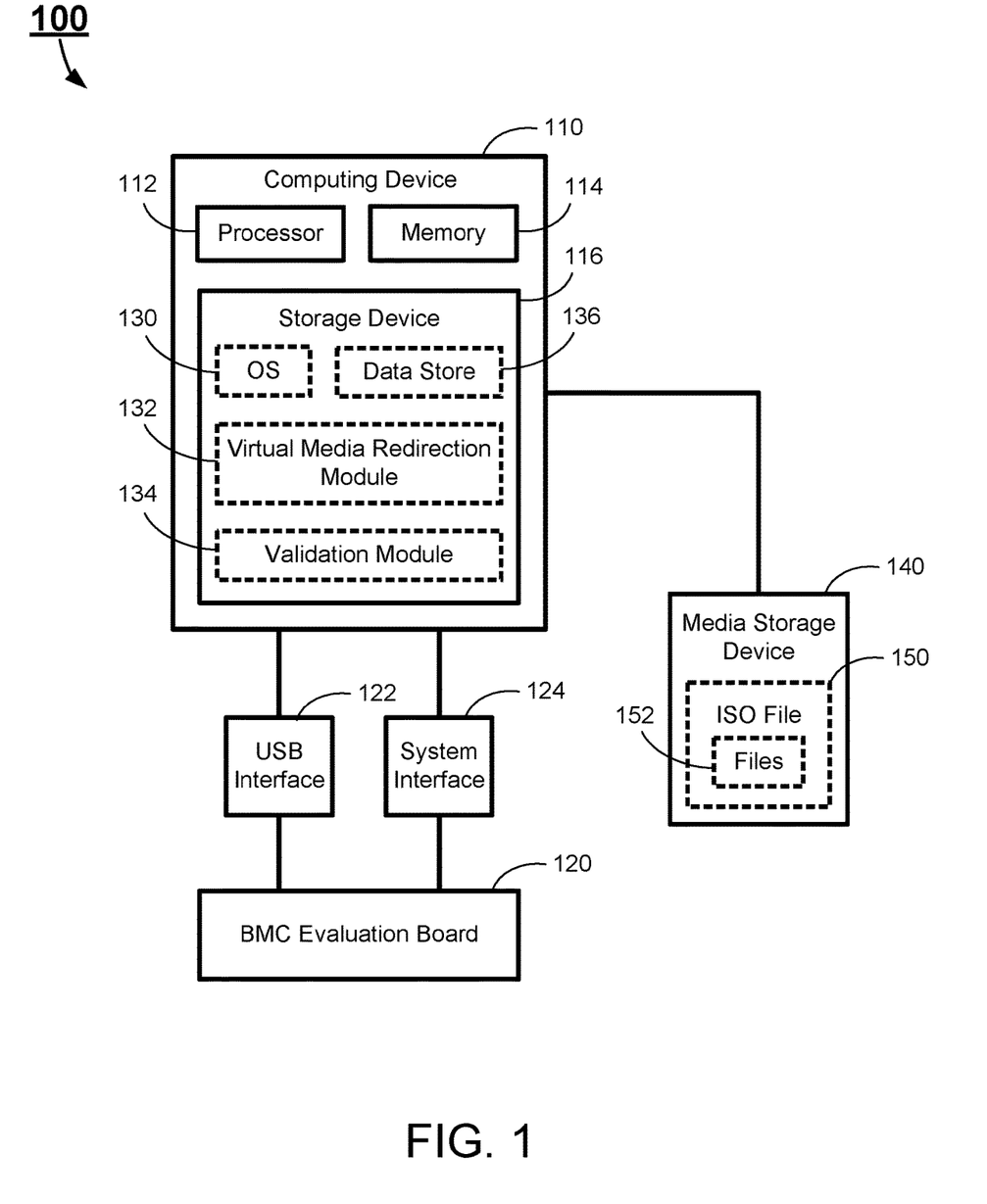
FIG. 1 schematically depicts a system according to certain embodiments of the present disclosure.

In one aspect, the present disclosure relates to a system to perform a test of a virtual media redirection process. FIG. 1 shows a system according to certain embodiments of the present disclosure. As shown in FIG. 1, the system 100 includes a computing device 110, a BMC evaluation board 120, and a media storage device 140. The BMC evaluation board 120 is connected to the computing device 110 via multiple interfaces, including a universal serial bus (USB) interface 122 and a system interface 124. Further, although not explicitly shown in FIG. 1, the media storage device 140 may be located at the client computing device, which is communicatively connected to the computing device 110 via a network. In certain embodiments, the network may be a wired or wireless network, and may be of various forms, such as a public network and a private network. Examples of the network may include, but not limited to, a local area network (LAN) or a wide area network (WAN) including the Internet. In certain embodiments, two or more different networks and/or interfaces may be applied to interconnect the computing device 110 with the media storage device 140.

The computing device 110 is used to perform a plurality of tests in the development project of the BMC. In certain embodiments, the computing device 110 functions as a host computer for the BMC, which is represented by the BMC evaluation board 120. In certain embodiments, the computing device 110 may be may be a general purpose computer, a specialized computer, a server, or any other types of computing device, such as a desktop computer, a laptop computer, a tablet, or other network connected computing device.

As shown in FIG. 1, the computing device 110 includes a processor 112, a memory 114, and a storage device 116. In certain embodiments, the computing device 110 may include necessary hardware components and software components (not shown) to perform its corresponding tasks. Examples of these hardware and software components may include, but not limited to, a baseboard (motherboard), other required memory, interfaces, buses, Input/Output (I/O) modules and peripheral devices. In certain embodiments, for the purpose of testing the virtual media redirection features of a BMC, the computing device 110 may utilize certain specific hardware and software components. For example, a testing environment may be created using Gigabyte GA H87-D3H motherboard as the baseboard of the computing device 110.

The processor 112 controls operation of the computing device 110. In certain embodiments, the processor 112 may be a central processing unit (CPU). The processor 112 may execute any computer executable code or instructions, such as the operating system (OS) 130 and other applications, codes or instructions stored in the computing device 110. In certain embodiments, the computing device 110 may run on or more than one processor, such as two processors, four processors, eight processors, or any suitable number of processors.

The memory 114 may be a volatile memory, such as the random-access memory (RAM), for storing the data and information during the operation of the computing device 110. In certain embodiments, the memory 114 may be a volatile memory array. In certain embodiments, the computing device 110 may run on more than one memory 114.

The storage device 116 is a non-volatile storage media or device for storing the computer executable code, such as the OS 130 and other software applications for the computing device 110. Examples of the storage device 116 may include flash memory, memory cards, USB drives, or other types of non-volatile storage devices such as hard drives, floppy disks, optical drives, or any other types of data storage devices. In certain embodiments, the computing device 110 may have more than one storage device 116, and the OS 130 and other applications of the computing device 110 may be stored in the more than one storage device 116 separately.

As shown in FIG. 1, the computer executable code stored in the storage device 116 may include the OS 130, a virtual media redirection module 132, a validation module 134, and a data store 136. Each of the modules of the computing device 110 includes computer executable code or instructions for performing certain corresponding operations on the computing device 110. In certain embodiments, each of the modules may further include one or more sub-modules. Alternatively, in certain embodiments, some or all of the modules may collectively form a single module.

The OS 130 may be a collective management software application managing the operation of the computing device 110. For example, the OS 130 may include a set of functional programs that control and manage operations of the devices connected to the computing device 110. The set of application programs provide certain utility software for the user to manage the computing device 110. In certain embodiments, the OS 130 is operable to multitask, i.e., execute computing tasks in multiple threads, and thus may be any of the following: MICROSOFT CORPORATION's "WINDOWS 95," "WINDOWS CE," "WINDOWS 98," "WINDOWS 2000" or "WINDOWS NT", "WINDOWS Vista,", "WINDOWS 7," and "WINDOWS 8," operating systems, IBM's OS/2 WARP, APPLE's MACINTOSH OSX operating system, LINUX, UNIX, etc. In certain embodiments, for the purpose of testing the virtual media redirection features of a BMC, the OS 130 may be a Linux-compatible OS, such as Ubuntu. For example, a testing environment may be created using Ubuntu 12.04 as the OS 130.

The virtual media redirection module 132 is a module to perform virtual media redirection for the computing device 110. It should be noted that the virtual media redirection module 132 is generally a module of the BMC, and for the purpose of testing the virtual media redirection features of a BMC, the virtual media redirection module 132 is provided at the computing device 110 as shown in FIG. 1. In certain embodiments, the virtual media redirection module 132 may be a VMCLI module, which is an exact copy of the VMCLI application on a regular BMC. In operation, the virtual media redirection module 132 is configured to perform the virtual media redirection process to redirect the media file to the computing device 110 by emulating a virtual media at a local path of the computing device 110. For example, the virtual media redirection module 132 may emulate a virtual media via the USB interface 122, Once the virtual media is emulated at the local path, the virtual media redirection module 132 may copy the media file to the local path of the computing device 110, such that the copy of the media file may be accessible by the computing device 110 at the local path.

The validation module 134 is a software module provided for the purpose of validating the media file being redirected by the virtual media redirection module 132. In certain embodiments, for the testing purposes, the validation module 134 is an automated script module, which enables an automated validating process to be performed repeatedly in the test of the virtual media redirection process. For example, the validation module 134 may be a Linux Shell script, which may be automatically executed on the Linux compatible OS 130. In this case, a stress test of the virtual media redirection process may be realized without user intervention. In operation, the validation module 134 is configured to fetch or obtain, from the media storage device 140, a media file to be redirected based on the information stored in the data store 136. Once the media file is fetched, the validation module 134 may calculate a first checksum value A for the media file being fetched. In other words, the first checksum value A is obtained before the media file is redirected. After the virtual media redirection module 132 performs the virtual media redirection process to redirect the media file to the computing device 110, the validation module 134 then calculate a second checksum value B for the media file at the local path of the computing device 110. In other words, the second checksum value B is obtained after the media file is redirected. Once both checksum values are obtained, the validation module 134 may validate the media file by matching the second checksum value B with the first checksum value A. When A=B (i.e., the second checksum value B matches with the first checksum value A), the media file is validated, indicating that the redirection process is successful. On the other hand, when A!=B (i.e., the second checksum value B does not match with the first checksum value A), the media file is not validated, indicating that the redirection process fails. Based on the test result of the virtual media redirection process, the validation module 134 may generate a validation report. In certain embodiments, the validation report includes information indicating the virtual media redirection process to be successful or unsuccessful.

The data store 136 is configured to store information necessary for performing the test of the virtual media redirection process on the computing device 110. In certain embodiments, the information stored in the data store 136 may include, without being limited thereto, a user configuration file, which stores a list of information of the media files to be redirected. In certain embodiments, the information of each of the media files to be redirected may include a path of the media file. For example, a path of the media file should indicate the location of the media file stored in the media storage device 140.

The BMC evaluation board 120 is a printed circuit board containing a microprocessor chip and the minimal support logic needed for BMC testing purposes. In certain embodiments, the BMC evaluation board 120 includes all of the necessary hardware components of a BMC, such that the tests for the BMC development project may be performed. In certain embodiments, for the purpose of testing certain features of a BMC, such as the virtual media redirection feature, a specific BMC evaluation board 120 may be used. For example, a testing environment may be created using the AST2400 evaluation board having an ASPEED AST2400 IPMI chip as the BMC evaluation board 120.

The USB interface 122 is one of the communication interfaces between the BMC evaluation board 120 and the computing device 110. Specifically, the USB interface 122 a standardized interface under the USB industry standard that defines the cables, connectors and communications protocols used in a bus for connection, communication, and power supply between computers and electronic devices. USB was designed to standardize the connection of computer peripherals (including keyboards, pointing devices, digital cameras, printers, portable media players, disk drives and network adapters) to personal computers, both to communicate and to supply electric power. The USB interface 122 has become commonplace on other devices, such as smartphones, PDAs and video game consoles. USB has effectively replaced a variety of earlier interfaces, such as serial and parallel ports, as well as separate power chargers for portable devices. Currently, USB allows bi-directional communications between the computing devices and the USB devices, as USB 3.0 allows for device-initiated communications towards the host. In certain embodiments, the USB interface 122 is provided for the purpose of performing the test of the virtual media redirection process. When a virtual media is emulated by the virtual media redirection module 132, the virtual media may be exposed to the OS 130 of the computing device 110 as a USB device, such as a USB floppy drive, USB thumb drive, USB hard drive, USB CD-ROM/DVD-ROM drive, or other USB storage devices.

The system interface 124 is one of the communication interfaces to perform data transfer between the computing device 110 and the BMC evaluation board 120. In certain embodiments, the system interface 124 may be a typical standardized Intelligent Platform Management Interface (IPMI) system interfaces, such as a keyboard controller style (KCS) interface, a system management interface chip (SMIC) interface, or a block transfer (BT) interface. In certain embodiments, data transfer between the BMC evaluation board 120 and the computing device 110 may be in the format of IPMI messages, which may go through the system interface 124 or any other interfaces between the BMC evaluation board 120 and the computing device 110.

The media storage device 140 is a storage device which provides data of one or more media files to be retrieved by the host computing device 110. Specifically, the media storage device 140 may be a non-volatile storage device, such as a hard drive, a CD-ROM drive, a DVD-ROM drive or a solid state storage device, or may be a storage server including one or more storage devices. The location of the media storage device 140 in the system 100 may vary. For example, the media storage device 140 may be an external storage device located at the client computing device (not shown). In certain embodiments, the media device 170 may be a network storage device independent from, without being directly connected to, the computing device 110. In certain embodiments, the media storage device 140 may be implemented by multiple storage devices and/or storage servers distributed at different locations of the system 100. In certain embodiments, for testing purposes, the media storage device 140 may be located at the computing device 110 as an external storage device or a local storage device. Examples of the media storage device 140 may include, without being limited to, flash memory, memory cards, USB drives, hard drives, floppy disks, optical drives, or any other types of data storage devices.

In certain embodiments, the media storage device 140 contains one or more ISO image files 150, and for each of the ISO image files 150, a plurality of files 152 may be stored therein. The ISO image file 150 is an archive file of an optical disc, and it is a type of disk image composed of the data contents from every written sector on an optical disk, including its optical disk file system. In certain embodiments, a media file being redirected may be an ISO image file 150, or may be one of the files 152 in the ISO image file 150. In certain embodiments, the virtual media redirection process may be repeated performed, such that a plurality of the files 152 may be respectively redirected to the computing device 110 in separate redirection processes.

Figure 2:
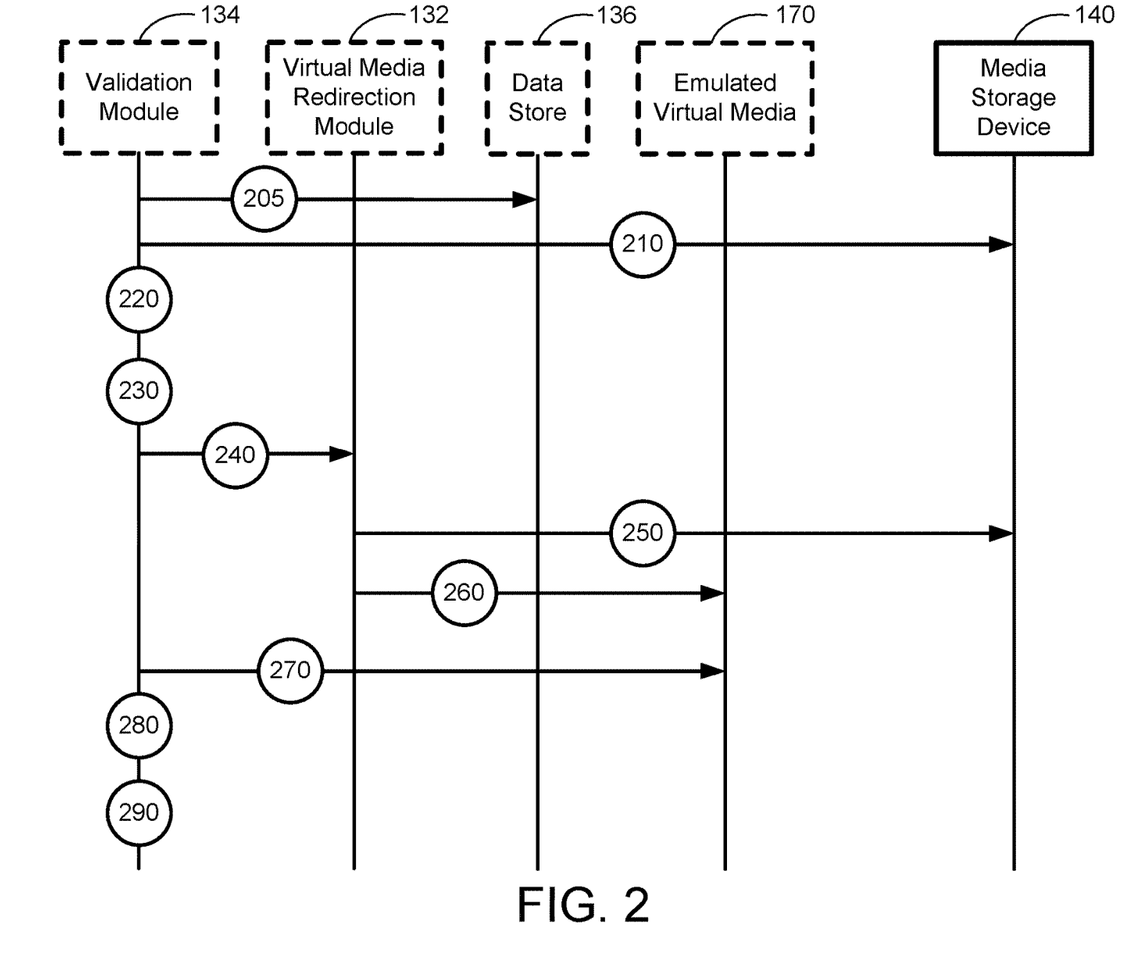
FIG. 2 schematically depicts operation of the automated script validation module according to certain embodiments of the present disclosure.

FIG. 2 schematically depicts operation of the automated script validation module according to certain embodiments of the present disclosure. In certain embodiments, the process as shown in FIG. 2 may be implemented on a system as shown in FIG. 1. It should be particularly noted that, unless otherwise stated in the present disclosure, the steps of the method may be arranged in a different sequential order, and are thus not limited to the sequential order as shown in FIG. 2.

As described above, the validation module 134 may be an automated script module. As shown in FIG. 2, when the validation module 134 starts, at procedure 205, the script of the validation module 134 will automatically run to retrieve the user configuration file from the data store 136. The user configuration file may include the information of the media files to be redirected. For example, the information of one of the media files to be redirected may include a path of the media file, which is stored in the media storage device 140. It should be noted that the media file may be the whole ISO image file 150, or may be a specific file 152 in the ISO image file 150. For example, a default path of the media file may indicate the ISO image file 150. When the path of the media file indicates a specific file 152 in the ISO image file 150, the media file will be the specific file 152. On the other hand, if the path of the media file is unspecified, the validation module 134 may recognize the ISO image file 150 as a whole is the media file.

Once the information of a media file to be redirected is obtained, at procedure 210, the validation module 134 may fetch or obtain the media file from the media storage device 140. In certain embodiments, the validation module 134 may check the availability of the ISO image path and/or the path of the media file to ensure the media file to be redirected exists in the media storage device 140. If the media file does not exist in the media storage device 140, the script of the validation module 134 will automatically abort the process for the media file.

Upon fetching the media file from the media storage device 140, at procedure 220, the validation module 134 may calculate a first checksum value A for the media file being fetched. When the media file is a specific file 152 in the ISO image file 150, the first checksum value A is calculated for the specific file 152 alone. On the other hand, if the media file is the ISO image file 150, the validation module 134 may perform checksum for the ISO image file 150 to obtain the first checksum value A.

Once the first checksum value A for the media file is obtained, the media file may be subject to the redirection process. However, to avoid confusion between multiple concurrent redirection connections, at procedure 230, the validation module 134 will check whether any USB redirection connection exists for the computing device 110. For example, in a stress test of the virtual media redirection process, consecutive USB redirection connections may be established in a series. To ensure that the validating process is correctly performed, if any USB redirection connection exists, the validation module 134 will kill or disconnect the USB redirection connection. In other words, there will be no existing USB redirection connection for the computing device 110 when the media file is redirected.

At procedure 240, the validation module 134 may call the virtual media redirection module 132 to perform the redirection process. Upon initiation, the virtual media redirection module 132 may perform the virtual media redirection process to redirect the media file to the computing device 110 by emulating a virtual media 170 at a local path of the computing device 110. In certain embodiments, when the virtual media redirection module 132 is the VMCLI application, the VMCLI may invoke a command to redirect the media file, and initialize a SSH session to the computing device 110. Then, at procedure 250, the virtual media redirection module 132 may access the media file from the media storage device 140, and at procedure 260, the virtual media redirection module 132 copies the media file to the emulated virtual media 170 at the local path of the computing device 110.

Once the media file is redirected, at procedure 270, the validation module 134 may access the copy of the media file at the local path of the computing device 110 (i.e., the emulated virtual media 170). At procedure 280, the validation module 134 may calculate a second checksum value B for the copy of the media file being redirected. Assuming that the redirection process is successful, the copy of the media file should be an exact copy of the original media file, and the second checksum value B should be identical to the first checksum value A. At procedure 290, the validation module 134 validates the media file by matching the second checksum value B with the first checksum value A. When A=B (i.e., the second checksum value B matches with the first checksum value A), the media file is validated, indicating that the redirection process is successful. On the other hand, when A!=B (i.e., the second checksum value B does not match with the first checksum value A), the media file is not validated, indicating that the redirection process fails. Once the test result of the virtual media redirection process is determined, the validation module 134 may generate a validation report based on the test result, such that a user may access the validation report.

As described above, the automated script of the validation module 134 may be used in a stress test of the virtual media redirection process. Further, since checksum is used for validation of the media file, data accuracy of the redirection process may be covered. Moreover, the user does not need to launch a keyboard, video and mouse (KVM) session during the test, and all of the testing process may be automatically performed without user intervention.

Figure 3A:
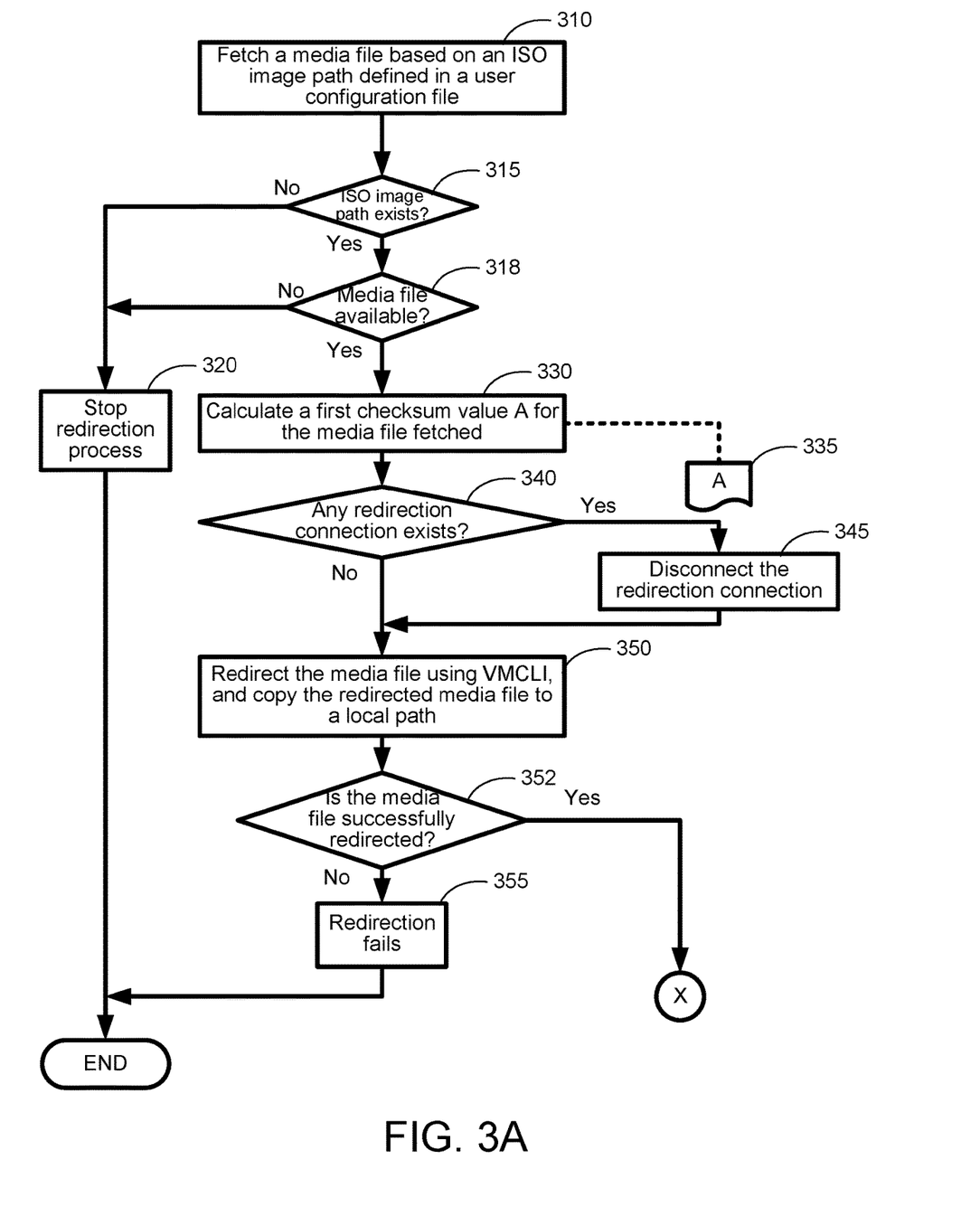
FIGS. 3A and 3B depict a flowchart of a method of performing a test of a virtual media redirection process according to certain embodiments of the present disclosure.
Figure 3B:
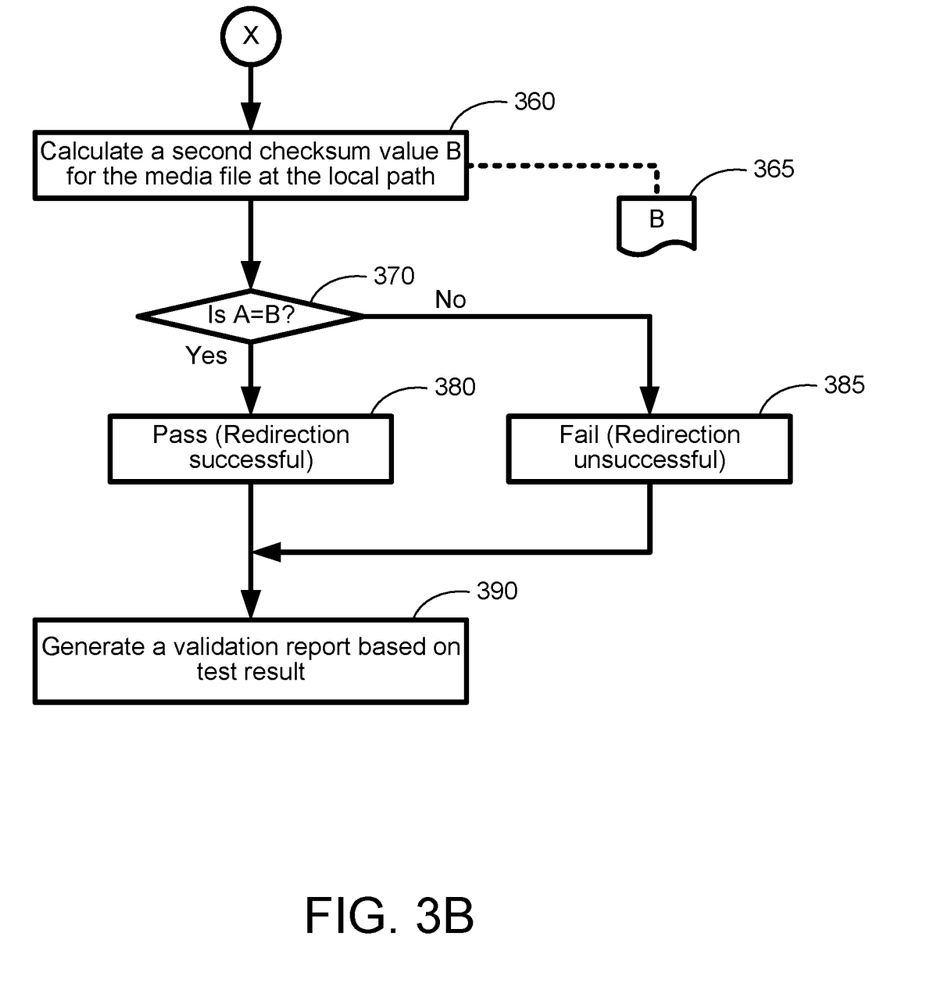

A further aspect of the present disclosure is directed to a method for performing a test of a virtual media redirection process. FIGS. 3A and 3B depicts a flowchart of a method of performing a test of a virtual media redirection process according to certain embodiments of the present disclosure. In certain embodiments, the method as shown in FIGS. 3A and 3B may be implemented on a system as shown in FIG. 1. It should be particularly noted that, unless otherwise stated in the present disclosure, the steps of the method may be arranged in a different sequential order, and are thus not limited to the sequential order as shown in FIGS. 3A and 3B.

As shown in FIG. 3A, at procedure 310, when the automated script of the validation module 134 is executed at the computing device 110, the script will fetch a media file from the media storage device 140 based on an ISO image path defined in a user configuration file, which is stored in the data store 136. At procedure 315, the script checks if the ISO image path exists. At procedure 318, the script checks if the media file is available. If the media file is available, the script may fetch and obtain the media file. On the other hand, if the media file does not exist at the path defined in the user configuration file, at procedure 320, the script will stop the redirection process for this non-existing media file.

At procedure 330, once the media file is fetched, the script will calculate a first checksum value A for the media file fetched. In other words, at procedure 335, the first checksum value A is obtained prior to the virtual media redirection process being performed. Then, at procedure 340, the script checks if any redirection connection exists for the computing device 110. If such redirection connection exists, at procedure 345, the script disconnects or kills the redirection connection.

At procedure 350, the script calls the virtual media redirection module 132 (e.g., the VMCLI application), and performs redirection of the media file using VMCLI. In the redirection process, the redirected media file is copied to the local path of the computing device 110 (i.e., the emulated virtual media 170).

Once the media file is redirected, at procedure 352, the script checks if the media file is successfully redirected. In particular, the following commands may be used to check if the media file (listed as an image name in the grep command output) is successfully redirected:

ls -1/dev/disk/by-id/usb*|grep Floppy0' (checking floppy image)

ls -l/dev/disk/by-id/usb*|grep CDROM0' (checking CD image)

ls -l/dev/disk/by-id/usb*|grep HDisk0' (checking HDD image)

If the media file is successfully redirected, the script moves to procedure 360. On the other hand, if the media file is not successfully redirected, at procedure 355, the script will determine that the redirection process fails, and stop the process.

At procedure 360, once the media file is successfully redirected, the script will calculate a second checksum value B for the media file at the local path. In other words, at procedure 365, the second checksum value B is obtained after the virtual media redirection process is performed.

Once both checksum values have been obtained, at procedure 370, the script compares the values and determines whether A=B. When A=B (i.e., the second checksum value B matches with the first checksum value A), the script goes to procedure 380, and the media file is validated, indicating that the redirection process is successful. On the other hand, when A!=B (i.e., the second checksum value B does not match with the first checksum value A), the script goes to procedure 385, and the media file is not validated, indicating that the redirection process fails. At procedure 390, based on the test result of the virtual media redirection process, the validation module 134 may generate a validation report. In certain embodiments, the validation report includes information indicating the virtual media redirection process to be successful or unsuccessful.

In yet another aspect, the present disclosure relates to a non-transitory computer storage medium storing computer-executable code. When the computer-executable code is executed by a processor of a computing device for performing a test of a virtual media redirection process, the executed code causes the processor to perform the method as described above. In certain embodiments, the computer executable code may include the virtual media redirection module 132 and the validation module 134 as described above. In certain embodiments, the non-transitory computer readable medium may include, but not limited to, the storage device 116 of the computing device 110 as described above, or any other storage media of the computing device 110.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a computing device for performing a test of a virtual media redirection process, the computing device comprising a processor, a universal serial bus (USB) interface and a storage device storing computer executable code, wherein the computer executable code, when executed at the processor, is configured to:
obtain, from a media storage device, a media file to be redirected;
calculate a first checksum value for the media file being obtained;
prior to performing the virtual media redirection process, determine whether a USB redirection connection exists for the computing device using the USB interface;
in response to determining that the USB redirection connection does not exist for the computing device using the USB interface, perform the virtual media redirection process by emulating a virtual media at a local path of the computing device via the USB interface to redirect the media file to the computing device, and copy the media file to the local path of the computing device;
in response to determining that the USB redirection connection exists, disconnect the USB redirection connection prior to performing the virtual media redirection process, and after disconnecting the USB redirection connection, perform the virtual media redirection process by emulating the virtual media at the local path of the computing device via the USB interface to redirect the media file to the computing device, and copy the media file to the local path of the computing device;
calculate a second checksum value for the media file at the local path of the computing device; and
validate the media file by matching the second checksum value with the first checksum value, wherein the media file is validated when the second checksum value matches with the first checksum value.

2. The system as claimed in claim 1, wherein the media file is an ISO image file.

3. The system as claimed in claim 1, wherein the media file is a specific file in an ISO image file.

4. The system as claimed in claim 1, wherein the computer executable code comprises:
a virtual media redirection module, configured to perform the virtual media redirection process for the computing device by emulating the virtual media at the local path of the computing device, and to copy the media file to the local path; and
a validation module configured to:
obtain the media file to be redirected;
calculate the first checksum value for the media file being obtained;
calculate the second checksum value for the media file at the local path of the computing device; and
validate the media file by matching the second checksum value with the first checksum value.

5. The system as claimed in claim 4, wherein the validation module is an automated script module.

6. The system as claimed in claim 4, wherein the virtual media redirection module is a virtual media command line interface (VMCLI) module, configured to emulate the virtual media at the local path of the computing device via the USB interface.

7. The system as claimed in claim 6, further comprising:
an evaluation board communicatively connected to the computing device via the USB interface for the test of the virtual media redirection process.

8. The system as claimed in claim 6, wherein the validation module is further configured to:
prior to performing the virtual media redirection process, determine whether the USB redirection connection exists for the computing device; and
in response to determining that the USB redirection connection exists, disconnect the USB redirection connection prior to performing the virtual media redirection process.

9. The system as claimed in claim 4, wherein the validation module is further configured to:
generate a validation report based on a test result of the virtual media redirection process, wherein:
the test result comprises information indicating the virtual media redirection process to be successful when the media file is validated; and
the test result comprises information indicating the virtual media redirection process to be unsuccessful when the media file is not validated.

10. The system as claimed in claim 1, further comprising:
a client computing device communicatively connected to the computing device, wherein the media storage device is located at the client computing device.

11. A method for performing a test of a virtual media redirection process, comprising:
obtaining, by a validation module executed at a computing device, a media file to be redirected from a media storage device, wherein the computing device comprises a universal serial bus (USB) interface;
calculating, by the validation module executed at the computing device, a first checksum value for the media file being obtained;
prior to performing the virtual media redirection process, determining, by the validation module executed at the computing device, whether a USB redirection connection exists for the computing device using the USB interface;
in response to determining that the USB redirection connection does not exist for the computing device using the USB interface, performing, by a virtual media redirection module executed at the computing device, the virtual media redirection process by emulating a virtual media at a local path of the computing device via the USB interface to redirect the media file to the computing device, and copy the media file to the local path of the computing device;
in response to determining that the USB redirection connection exists, disconnecting the USB redirection connection by the validation module executed at the computing device prior to performing the virtual media redirection process, and after disconnecting the USB redirection connection, performing, by the virtual media redirection module executed at the computing device, the virtual media redirection process by emulating the virtual media at the local path of the computing device via the USB interface to redirect the media file to the computing device, and copying the media file to the local path of the computing device;

calculating, by the validation module executed at the computing device, a second checksum value for the media file at the local path of the computing device; and validating, by the validation module executed at the computing device, the media file by matching the second checksum value with the first checksum value, wherein the media file is validated when the second checksum value matches with the first checksum value.

12. The method as claimed in claim 11, wherein the validation module is an automated script module.

13. The method as claimed in claim 11, wherein the virtual media redirection module is a virtual media command line interface (VMCLI) module, configured to emulate the virtual media at the local path of the computing device via the USB interface.

14. The method as claimed in claim 11, further comprising:
generating, by the validation module executed at the computing device, a validation report based on a test result of the virtual media redirection process, wherein:
the test result comprises information indicating the virtual media redirection process to be successful when the media file is validated; and
the test result comprises information indicating the virtual media redirection process to be unsuccessful when the media file is not validated.

15. A non-transitory computer readable medium storing computer executable code, wherein the computer executable code, when executed at a processor of a computing device for performing a test of a virtual media redirection process, is configured to:
obtain, from a media storage device, a media file to be redirected;
calculate a first checksum value for the media file being obtained;
prior to performing the virtual media redirection process, determine whether a USB redirection connection exists for the computing device using a universal serial bus (USB) interface;
in response to determining that the USB redirection connection does not exist for the computing device using the USB interface, perform the virtual media redirection process by emulating a virtual media at a local path of the computing device via the USB interface to redirect the media file to the computing device, and copy the media file to the local path of the computing device;
in response to determining that the USB redirection connection exists, disconnect the USB redirection connection prior to performing the virtual media redirection process, and after disconnecting the USB redirection connection, perform the virtual media redirection process by emulating the virtual media at the local path of the computing device via the USB interface to redirect the media file to the computing device, and copy the media file to the local path of the computing device;
calculate a second checksum value for the media file at the local path of the computing device; and
validate the media file by matching the second checksum value with the first checksum value, wherein the media file is validated when the second checksum value matches with the first checksum value.

16. The non-transitory computer readable medium as claimed in claim 15, wherein the computer executable code comprises:
a virtual media redirection module, configured to perform the virtual media redirection process for the computing device by emulating the virtual media at the local path of the computing device, and to copy the media file to the local path; and
a validation module configured to:
obtain the media file to be redirected;
calculate the first checksum value for the media file being obtained;
calculate the second checksum value for the media file at the local path of the computing device; and
validate the media file by matching the second checksum value with the first checksum value;
wherein the validation module is an automated script module.

17. The non-transitory computer readable medium as claimed in claim 16, wherein the virtual media redirection module is a virtual media command line interface (VMCLI) module, configured to emulate the virtual media at the local path of the computing device via the USB interface.

18. The non-transitory computer readable medium as claimed in claim 17, wherein the validation module is further configured to:
prior to performing the virtual media redirection process, determine whether the USB redirection connection exists for the computing device; and
in response to determining that the USB redirection connection exists, disconnect the USB redirection connection prior to performing the virtual media redirection process.

19. The non-transitory computer readable medium as claimed in claim 16, wherein the validation module is further configured to:
generate a validation report based on a test result of the virtual media redirection process, wherein:
the test result comprises information indicating the virtual media redirection process to be successful when the media file is validated; and
the test result comprises information indicating the virtual media redirection process to be unsuccessful when the media file is not validated.

* * * * *